(12) United States Patent
Johnson et al.

(10) Patent No.: US 7,668,175 B2  
(45) Date of Patent: Feb. 23, 2010

(54) DYNAMIC POWER MANAGEMENT FOR I/O RESOURCE POOLS

(75) Inventors: Darrin P. Johnson, Mountain View, CA (US); Sunay Tripathi, San Jose, CA (US); Randall S. Fishel, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 654 days.

(21) Appl. No.: 11/286,085

(22) Filed: Nov. 22, 2005

(65) Prior Publication Data

US 2007/0116049 A1    May 24, 2007

(51) Int. Cl.
*H04L 12/28* (2006.01)
(52) U.S. Cl. .................................. 370/395.41; 370/229
(58) Field of Classification Search ................ 370/229, 370/235, 232, 235.1, 252, 253, 395.2, 395.21, 370/401.402, 395.41, 231
See application file for complete search history.

(56) References Cited

U.S. PATENT DOCUMENTS

| | | | |
|---|---|---|---|
| 6,377,554 B1 * | 4/2002 | Farnsworth et al. | 370/252 |
| 6,915,128 B1 * | 7/2005 | Oh | 455/424 |
| 6,973,037 B1 * | 12/2005 | Kahveci | 370/236 |
| 7,136,636 B1 * | 11/2006 | McLaughlin | 455/423 |
| 2004/0181794 A1 * | 9/2004 | Coleman et al. | 718/104 |

OTHER PUBLICATIONS

Garner, M., "Internet Protocol Network Multipathing" downloaded from the internet Aug. 24, 2005, http://www.sun.com/blueprints/1102/806-7230.pdf, published Nov. 2002, 19 pp.
IEEE Std 802.3ad-2000 "Aggregation of Multiple Link Segments" (Approved Mar. 30, 2000, IEEE-SA Standards Board), 183 pp.

* cited by examiner

*Primary Examiner*—Brenda Pham
(74) *Attorney, Agent, or Firm*—Osha • Liang LLP

(57) ABSTRACT

Methods and apparatus for managing a pool of I/O interfaces associated with one or more I/O devices are disclosed. The I/O bandwidth utilization of the I/O devices is ascertained and compared with an upper threshold and a lower threshold. When the I/O bandwidth utilization is greater than the upper threshold, the resources provided by the pool of I/O interfaces are increased. When the I/O bandwidth utilization is less than the lower threshold, the resources provided by the pool of I/O interfaces are decreased.

22 Claims, 5 Drawing Sheets

DYNAMIC POWER MANAGEMENT FOR I/O RESOURCE POOLS

BACKGROUND

Most modern computer systems include the capability to limit power consumption by suspending or hibernating the system as a whole when the system is not in use. Some operating systems also include the capability to reduce the power levels for some system components. For instance, the power that is provided to the central processing unit (CPU) of a computer system may be reduced. As another example, the display screen may be dimmed to conserve power consumption by the computer system.

Power consumption may be similarly controlled with respect to different types of Input/Output (I/O) functionality including but certainly not limited to Ethernet, ATM, Fibre Channel, Infiniband, SCSI, etc. Data is typically transmitted and received across an I/O interconnect via an interface (i.e., I/O interface) that can either be an embedded device or a host bus adapter. For instance, the interface may be a Network Interface Card (NIC), a SCSI card, Fibre Channel, ATM, Myranet, InfiniBand, USB, Firewire (1394), etc. While some systems include a single interface for a particular I/O technology, computer systems in a server environment often include multiple interfaces. In order to reduce the power consumption associated with the interfaces, each individual interface may be powered on, powered down or powered to an intermediate state (e.g. card powered on but PHY powered off). In other words, the power consumption of each interface is individually managed.

In view of the above, it would be beneficial if power consumption associated with a pool of resources such as interfaces of a given I/O technology could be accomplished in a more effective manner.

SUMMARY

Methods and apparatus for managing a pool of resources are disclosed. This is accomplished by grouping the resources, thereby enabling the resources to be managed as a single resource. In this manner, dynamic power management may be performed for the pool of resources.

In accordance with one aspect of the invention, a pool of resources associated with a plurality of interfaces of a network device (e.g., I/O device) is managed. More particularly, a demand on the I/O device is ascertained. A level of resources provided by the pool of resources is also determined. When the demand on the I/O device is greater than the level of resources provided by the pool of resources, the level of resources provided by the pool of resources is increased. When the demand on the I/O device is less than the level of resources provided by the pool of resources, the level of resources provided by the pool of resources is decreased.

In accordance with another aspect of the invention, the pool of resources is a pool of interfaces. The pool of interfaces associated with one or more network devices is managed by ascertaining the I/O bandwidth utilization of the network devices. The I/O bandwidth utilization is then compared with an upper threshold and a lower threshold. When the I/O bandwidth utilization is greater than the upper threshold, the resources provided by the pool of interfaces are increased. When the I/O bandwidth utilization is less than the lower threshold, the resources provided by the pool of interfaces are decreased.

In accordance with yet another aspect of the invention, dynamic power management is performed for a plurality of communication paths between one or more initiators and one or more targets, where each of the plurality of communication paths is associated with an interface of one of the initiators. A load associated with the plurality of communication paths is ascertained. The load is compared with an upper threshold and a lower threshold. When the load is greater than the upper threshold, power provided to the interface associated with at least one of the plurality of communication paths is increased. When the load is less than the lower threshold, power provided to the interface associated with at least one of the plurality of communication paths is decreased.

The embodiments of the invention may be implemented software, hardware, or a combination of hardware and software. The invention can also be embodied as computer readable code on a computer readable medium. In addition, data structures disclosed are also part of the invention.

BRIEF DESCRIPTION OF THE DRAWINGS

Embodiments of the invention may best be understood by reference to the following description taken in conjunction with the accompanying drawings in which.

DETAILED DESCRIPTION

In the following description for embodiments of the invention, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

The disclosed embodiments enable a pool of resources associated with a plurality of interfaces of a network device (e.g., an I/O device) to be managed. In accordance with one embodiment, the pool of resources includes a plurality of interfaces (e.g., I/O interfaces). Through managing the pool of resources as a group rather than separately, the resources may be managed more effectively.

Figure 1:
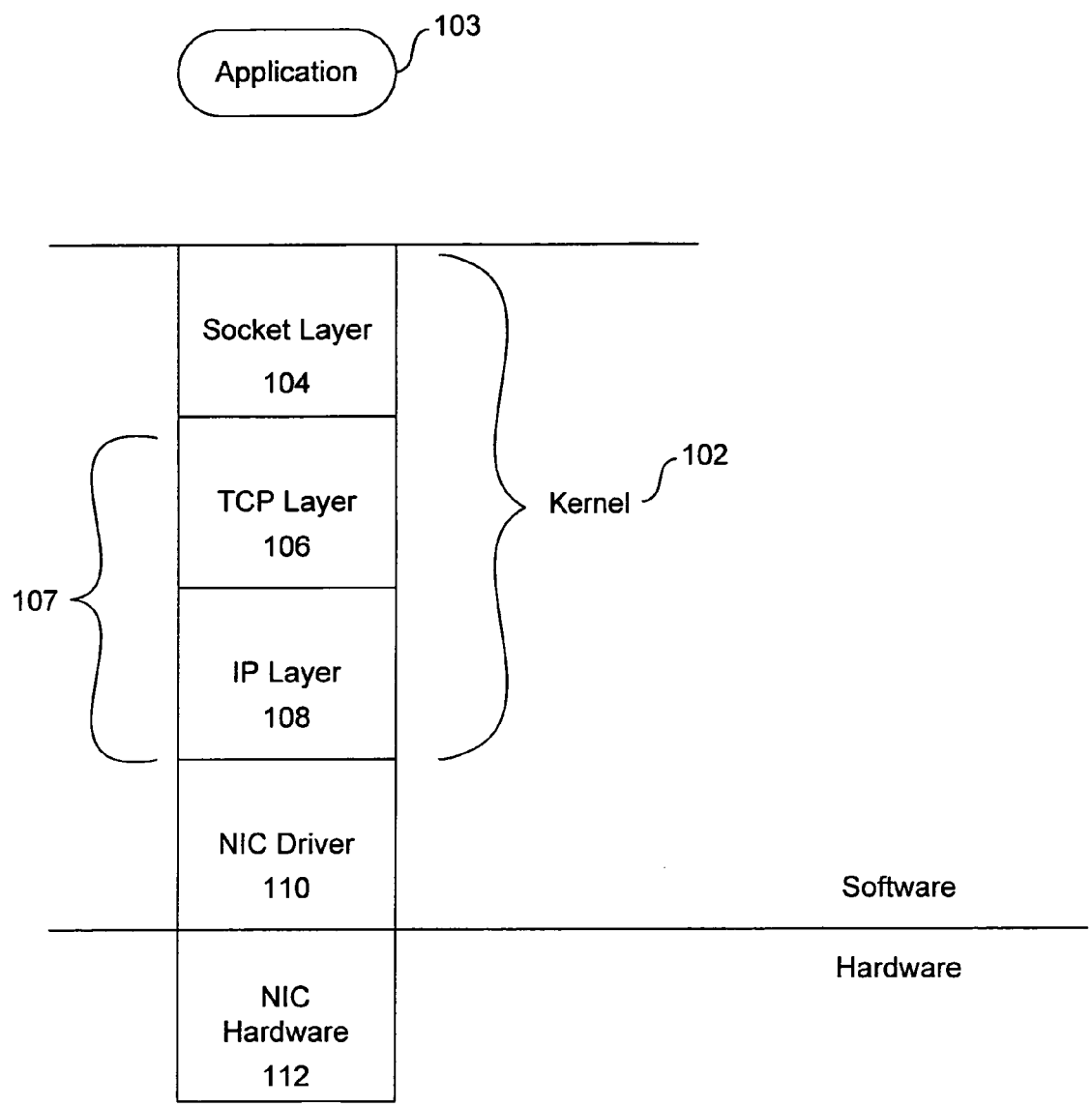
FIG. 1 is a block diagram illustrating a computer system including a Network Interface Card (NIC) as an example of one type of I/O system.

FIG. 1 is a block diagram illustrating a computer system including a Network Interface Card (NIC) as one example of an I/O system. As shown in FIG. 1, an exemplary operating system includes a kernel 102. The kernel's services may be requested by other parts of the operating system or by an application 103 through a system call routine.

At the top of network protocol stack 107, applications 103 are generally written to function through the use of a specific network protocol. Generally, these applications communicate directly with socket layer 104 of the kernel. The socket layer interfaces with system call routines that interface to the kernel 102.

The kernel 102 includes the socket layer 104 and the network protocol stack 107, which includes a TCP layer 106 and an IP layer 108. Specifically, the TCP layer 106 is capable of performing a TCP three way handshake to establish a TCP connection, and manages the assembling of a message or file into packets that may be transmitted over the Internet during the TCP connection. The IP layer 108 handles the addressing for each packet. In addition, a Network Interface Card (NIC) Driver 110 capable of communicating with a NIC 112 is in communication with the kernel 102 via a standard interface such as a Data Link Provider Interface.

Traditionally, when a NIC 112 receives a packet over the network, the NIC 112 issues an interrupt. The driver 110 notifies the operating system kernel 102 of the interrupt. The kernel 102 processes the interrupt and obtains the packet from the NIC 112 via the driver 110. As each packet is subsequently received by the NIC 112, the NIC 112 generates an interrupt. Thus, the operating system kernel 102 obtains each packet from the NIC 112 as interrupts are generated. Accordingly, packets that are received by the NIC 112 are typically processed immediately by the operating system kernel 102.

Figure 2:
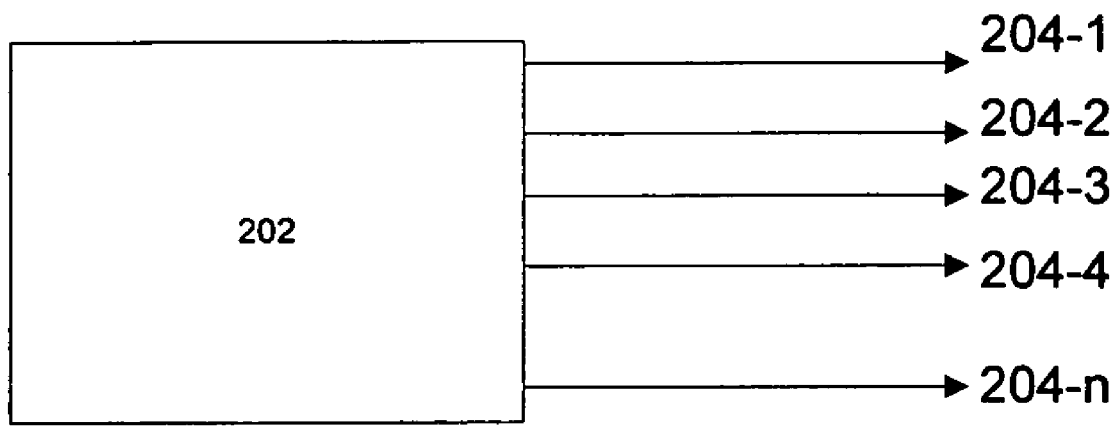
FIG. 2 is a block diagram illustrating a system in which the present invention may be implemented in accordance with one embodiment of the invention.

Many systems include multiple NICs. For instance, some systems may include up to 16 NICs. FIG. 2 is a block diagram illustrating a system in which the present invention may be implemented to manage a pool of NICs in accordance with one embodiment of the invention. As shown in FIG. 2, system 202 includes a plurality of NICs 204-1, 204-2, 204-3, 204-4 . . . 204-n, enabling the system 202 to receive and transmit packets via a network 206. Although five NICs are illustrated in this example, a pool of NICs may include any number of NICs. Each NIC may have an associated driver as set forth above with reference to FIG. 1. Thus, a NIC driver may be associated with one or more NICs.

The disclosed embodiments may be applied to manage a pool of resources such as a pool of I/O interfaces (e.g., NICs). More particularly, the power provided to the pool of resources may be managed dynamically. This may be accomplished via one or more drivers associated with the pool of interfaces. Through the driver(s), one or more interfaces may be powered on or off. Similarly, if one or more of the interfaces support multiple power levels, the change in power level of these interfaces may be accomplished via a corresponding driver.

Each system 202 may act as an initiator and therefore send packets to one or more targets via the network 206. As shown, each of the I/O interfaces 204-1, 204-2, 204-3, 204-4 . . . 204-n may be associated with a different interface of the initiator. Thus, a plurality of communication paths may be established between the initiator and the targets. In other words, each of the communication paths may be associated with an interface of the initiator. However, through the disclosed embodiments, the interfaces appear logically to the network and system 202 as a single interface.

In order to determine whether power provided to one or more of the interfaces should be increased or decreased, a load (e.g., network bandwidth utilization) associated with the communication paths may be ascertained. Once ascertained, the load may be compared with an upper threshold and a lower threshold. For instance, the load may be compared with the total capacity of the group of physical interfaces (in their present state(s) and power level(s)), which may range from a lower threshold (e.g., zero) to an upper threshold. When the load is greater than the upper threshold, the power provided to the interface associated with at least one of the communication paths may be increased. Similarly, when the load is less than a lower threshold, the power provided to the interface associated with at least one of the communication paths may be decreased. For instance, power provided to the corresponding interface(s) may be turned on or increased, or alternatively, removed or reduced.

By aggregating the communication paths (e.g., NICs), the interfaces are managed as a group rather than individually. As a result, failover capability may be implemented. Moreover, bandwidth may be allocated more effectively.

Figure 3:
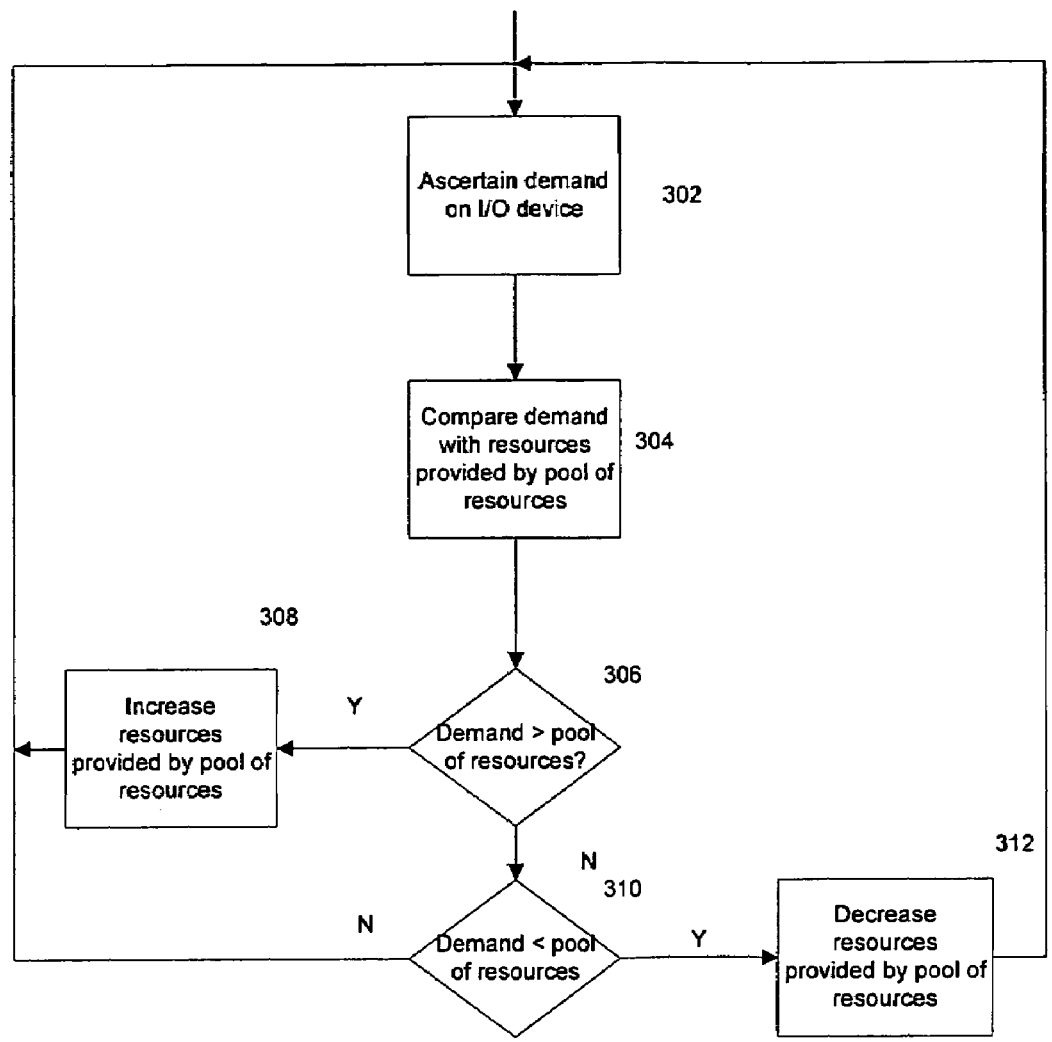
FIG. 3 is a process flow diagram illustrating one method of performing power management in accordance with one embodiment of the invention.

FIG. 3 is a simplified process flow diagram illustrating one method of performing power management in accordance with one embodiment of the invention. As shown at 302, the demand on an I/O device is ascertained. The demand is then compared to the level of resources provided by a pool of resources at 304. As set forth above, the pool of resources is associated with a plurality of interfaces of the network device. If the demand is greater than the level of resources provided by the pool of resources at 306, the level of resources provided by the pool of resources is increased at 308. However, if the level of resources provided by the pool of resources exceeds the demand on the network device at 310, the level of resources provided by the pool of resources is decreased at 312. The process continues at 302 to perform dynamic resource management for the network device.

As set forth above with reference to FIG. 3, one way to manage the pool of resources is to wait until the demand for resources is greater than the level of resources that can be provided by the pool of resources (i.e., the capacity of the pool of resources). However, system performance may be impacted by the inadequate level of resources provided by the pool of resources by the time that the demand exceeds the capacity of the pool of resources. Rather than waiting until the demand on the I/O device is greater than the resources available to it, an upper threshold may be established, where the level of resources provided by the pool of resources is increased when the demand exceeds this upper threshold. Thus, the upper threshold may represent the total capacity of the pool of resources, or merely a certain percentage of the capacity of the pool of resources. A lower threshold may similarly be established, where the level of resources provided by the pool of resources is decreased when the demand is less than this lower threshold. The upper and lower thresholds may be statically or dynamically established. Moreover, the upper and lower thresholds may vary with the device for which they are defined.

In accordance with one embodiment, the upper and lower thresholds identify the capacity (e.g., bit rate or packets per second) of the logical link. Thus, it may be desirable to statically or dynamically define the capacity of each of the physical links (i.e., interfaces). In this manner, the upper and lower thresholds may be established for the logical link.

The upper and lower thresholds may be defined in a variety of ways. For instance, the thresholds may be defined by establishing a percentage or, alternatively, a number of packets, bytes or bits per second.

Figure 4:
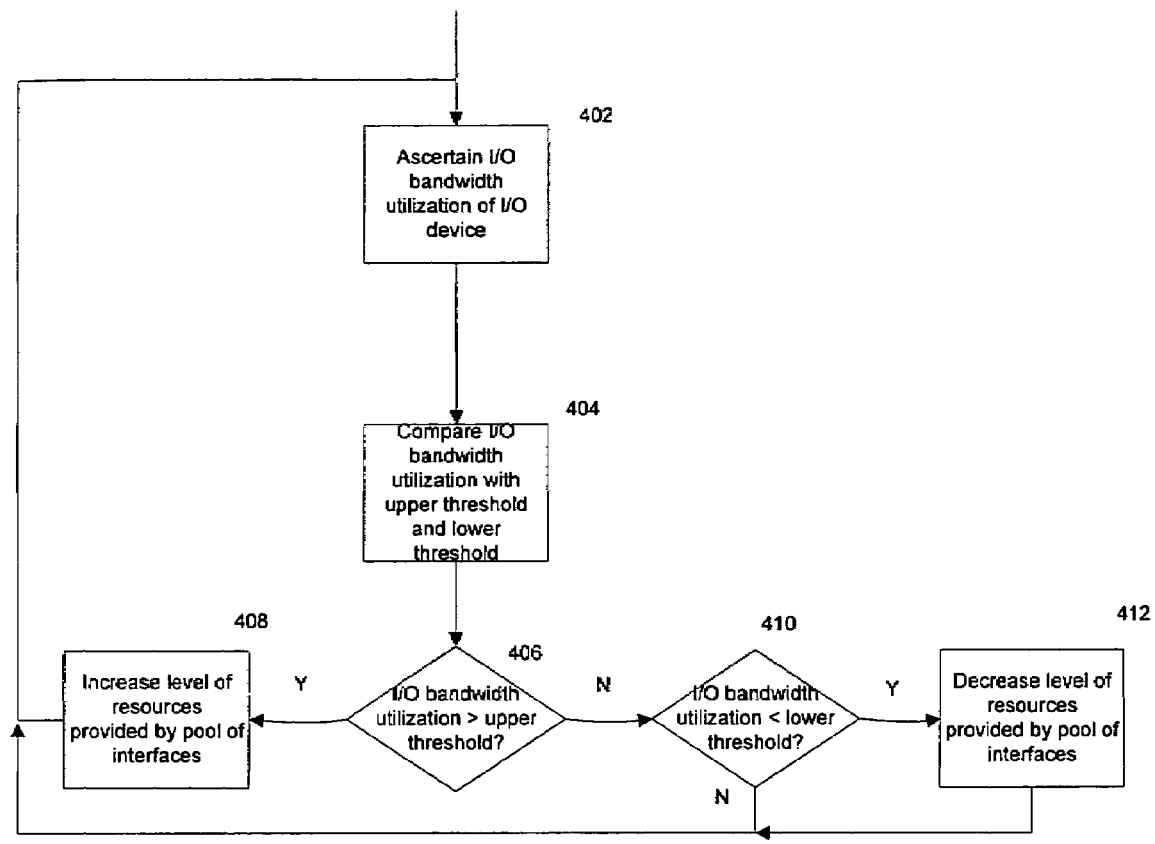
FIG. 4 is a process flow diagram illustrating one method of performing dynamic power management for a pool of I/O resources.

As described above, the pool of resources may include a pool of I/O interfaces. FIG. 4 is a process flow diagram illustrating one method of performing dynamic power management for a pool of interfaces in accordance with one embodiment of the invention. As shown at 402, the I/O bandwidth utilization of a network device is ascertained. For instance, the average size of the data transmitted and received by the I/O device may be multiplied by the number of transmissions (e.g., packets transmitted and received by the I/O device) during a specified period of time (e.g., per second). The I/O bandwidth utilization is then compared with the upper threshold and the lower threshold at 404. If the I/O bandwidth utilization exceeds the upper threshold at 406, the level of resources provided by the pool of interfaces is increased at 408. However, if the I/O utilization is less than the lower threshold at 410, the level of resources provided by the pool of interfaces is decreased at 412. The process continues at 402 to dynamically manage the resources provided by the pool of interfaces.

As described above with reference to blocks 408 and 412 of FIG. 4, the level of resources provided by the pool of I/O interfaces may be increased or decreased. In order to modify the level of resources provided by the pool of interfaces, the number of interfaces in the pool of interfaces may be increased or decreased. For instance, one or more interfaces may be added to the pool of interfaces or removed from the pool of interfaces. Moreover, one or more interfaces in the pool of interfaces may be powered on or off.

A variety of mechanisms may be used to manage the power provided to the pool of interfaces (e.g., NICs). For instance, the IP Multipathing (IPMP) level 3 protocol, which is disclosed in "Internet Protocol Network Multipathing (Updated)" available at http://www.sun.com/blueprints/1102/806-7230.pdf, published November 2002, by Mark Garner, which is incorporated herein by reference for all purposes, may be applied. As another example, the Aggregation of Multiple Link Segments, which is a level 2 protocol, as set forth in IEEE Std 802.3ad-2000 (Approved 30 Mar. 2000, IEEE-SA Standards Board), which is incorporated herein by reference for all purposes, may also be used. For instance, the corresponding driver may call a POWER_ON_RESOURCE( ) command or POWER_OFF_RESOURCE( ) command. Similarly, the ADD_RESOURCE( ) and REMOVE_RESOURCE( ) commands may be used to add a specified NIC to or remove a specified NIC from the pool of NICs.

In addition, some or all of the NICs in the pool of NICs may support multiple power levels. For instance, a first power level may support the transmission of packets, but not the receipt of packets, while a second power level may support both the transmission and receipt of packets. Thus, the power level of one or more of the NICs in the pool of NICs may be increased or decreased.

In order to manage the power levels associated with a NIC, it is desirable track the power levels supported by the NIC. For instance, the driver associated with the NIC may maintain a profile associated with the NIC that indicates the level of resources provided by the NIC. In other words, the profile may represent a power profile of an entity (e.g. NIC) driven by a driver accessing the profile. For instance, the profile may indicate a set of power states or levels supported by the NIC. Each power state may have an upper and lower threshold associated therewith. Such a profile may also indicate other information such as the manner in which the NIC will respond over time. For instance, the profile may indicate the latency associated with powering up the NIC. This information may be useful in selecting which NIC to power down. For instance, it may be desirable to reduce the power levels of multiple NICs rather than power down a particular NIC if the latency associated with powering up the NIC is significant.

As set forth above, each NIC may have an associated profile, which may be maintained by a driver associated therewith. The driver may therefore use this information to manage and track the power provided to each of the interfaces, the power utilization associated with those interfaces, and/or the total power provided to the interfaces over time. In this manner, energy consumption of a network device such as a server may be reduced.

It is important to note that although the above-described embodiments refer to a pool of NICs, the pool of resources may include other resources. For instance, the pool of resources may include a plurality of input/output (I/O) cards. In addition, although the pool of resources is described with reference to a single network device, the pool of resources may also support multiple network devices. Thus, the disclosed embodiments are merely illustrative, and therefore may be used to perform dynamic power management for a variety of system resources.

Figure 5:
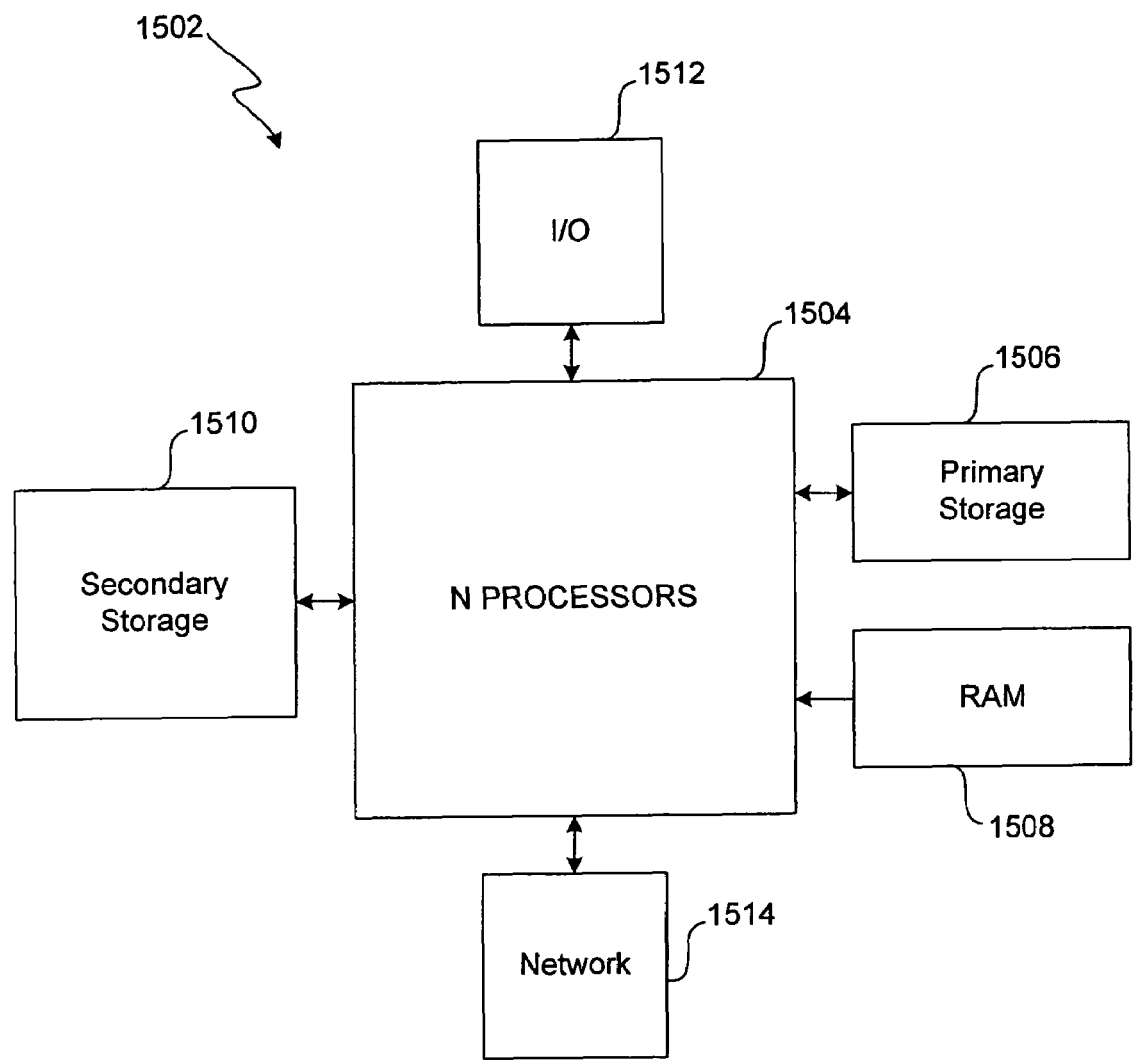
FIG. 5 is a block diagram illustrating a typical, general-purpose computer system suitable for implementing the present invention.

The present invention may be implemented on any suitable computer system. FIG. 5 illustrates a typical, general-purpose computer system 1502 suitable for implementing the present invention. The computer system may take any suitable form.

The computer system 1502 includes any number of processors 1504 (also referred to as central processing units, or CPUs) that may be coupled to memory devices including primary storage device 1506 (typically a read only memory, or ROM) and primary storage device 1508 (typically a random access memory, or RAM). Both the primary storage devices 1506, 1508 may include any suitable computer-readable media. The CPUs 1504 may generally include any number of processors.

A secondary storage 1510, which is typically a mass memory device, may also be coupled bi-directionally to CPUs 1504 and provides additional data storage capacity. The secondary storage 1510 is a computer-readable medium that may be used to store programs including computer code, data, and the like. Typically, the secondary storage 1510 is a storage medium such as a hard disk which is generally slower than primary storage devices 1506, 1508.

The CPUs 1504 may also be coupled to one or more input/output devices 1512 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, the CPUs 1504 optionally may be coupled to a computer or telecommunications network, e.g., an internet network or an intranet network, using a network connection as shown generally at 1514. With such a network connection, it is contemplated that the CPUs 1504 might receive information from the network, or might output information to the network in the course of performing the above-described method steps. Such information, which is often represented as a sequence of instructions to be executed using the CPUs 1504, may be received from and outputted to the network, for example, in the form of a computer data signal embodied in a carrier wave. It is contemplated that one or more of the elements of the computer system 1502 may be located remotely and accessed via a network.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the present embodiments are to be considered as illustrative and not restrictive, and the invention is not to be limited to the details given herein, but may be modified within the scope and equivalents of the appended claims.

What is claimed is:

1. A computer readable storage medium comprising instructions executable by a processor to perform a method of managing a pool of resources comprising a plurality of interfaces of an I/O device, the method comprising:

ascertaining a demand on the I/O device;

determining a level of resources provided by the pool of resources using a state and a power level for each of the plurality of interfaces of the I/O device;

when the demand on the I/O device is greater than the level of resources provided by the pool of resources, increasing the level of resources provided by the pool of resources; and when the demand on the I/O device is less than the level of resources provided by the pool of resources, decreasing the level of resources provided by the pool of resources.

2. The computer readable storage medium as recited in claim 1, wherein increasing the level of resources provided by the pool of resources comprises adding an interface to the pool of resources, and wherein decreasing the level of resources provided by the pool of resources comprises removing an interface from the pool of resources.

3. The computer readable storage medium as recited in claim 1, wherein increasing the level of resources provided by the pool of resources comprises turning on one interface of the plurality of interfaces and wherein decreasing the level of resources provided by the pool of resources comprises turning off one interface of the plurality of interfaces.

4. The computer readable storage medium as recited in claim 1, wherein increasing the level of resources provided by the pool of resources comprises increasing a power level of one interface of the plurality of interfaces, and wherein decreasing the level of resources provided by the pool of resources comprises decreasing a power level of one interface of the plurality of interfaces.

5. The computer readable storage medium as recited in claim 1, the method further comprising:

obtaining a profile associated with each of the plurality of interfaces.

6. The computer readable storage medium as recited in claim 5, wherein each profile indicates resources provided by the corresponding one of the plurality of interfaces.

7. The computer readable storage medium as recited in claim 6, wherein each profile indicates at least one selected from a group consisting of a latency associated powering up the corresponding interface and a set of power states supported by the corresponding interface.

8. A computer readable storage medium comprising instructions executable by a processor to perform a method of managing a pool of I/O interfaces associated with an I/O device, the method comprising:

ascertaining network bandwidth utilization of the I/O device;

comparing the network bandwidth utilization with an upper threshold and a lower threshold, wherein the upper threshold is determined using a state and a power level for each of the I/O interfaces;

when the network bandwidth utilization is greater than the upper threshold, increasing resources provided by the pool of I/O interfaces; and when the network bandwidth utilization is less than the lower threshold, decreasing the resources provided by the pool of I/O interfaces.

9. The computer readable storage medium as recited in claim 8, wherein ascertaining network bandwidth utilization comprises:

multiplying an average data transmission size by a number of data transmissions per second that are transmitted by the I/O device and received by the I/O device.

10. The computer readable storage medium as recited in claim 8, wherein increasing resources provided by the pool of I/O interfaces comprises:

turning on one of the I/O interfaces in the pool of I/O interfaces.

11. The computer readable storage medium as recited in claim 8, wherein decreasing resources provided by the pool of I/O interfaces comprises:

turning off one of the I/O interfaces in the pool of I/O interfaces.

12. The computer readable storage medium as recited in claim 8, wherein increasing resources provided by the pool of I/O interfaces comprises:

adding an I/O interface to the pool of I/O interfaces.

13. The computer readable storage medium as recited in claim 8, wherein decreasing resources provided by the pool of I/O interfaces comprises:

removing an I/O interface from the pool of I/O interfaces.

14. The computer readable storage medium as recited in claim 8, wherein increasing resources provided by the pool of I/O interfaces comprises:

increasing a power level of one of the I/O interfaces in the pool of I/O interfaces.

15. The computer readable storage medium as recited in claim 8, wherein decreasing resources provided by the pool of I/O interfaces comprises:

decreasing a power level of one of the I/O interfaces in the pool of I/O interfaces.

16. The computer readable storage medium as recited in claim 8, the method further comprising:

obtaining a profile associated with one of the I/O interfaces.

17. The computer readable storage medium as recited in claim 16, wherein each profile indicates resources provided by the corresponding one of the I/O interfaces.

18. The computer readable storage medium as recited in claim 17, wherein each profile indicates at least one selected from a group consisting of a latency associated powering up the corresponding I/O interface and a set of power states supported by the corresponding I/O interface.

19. The computer readable storage medium as recited in claim 18, wherein the upper threshold and lower threshold are associated with one or more of the power states.

20. A computer readable storage medium comprising instructions executable by a processor to perform a method of dynamic power management for a plurality of communication paths between at least one initiator and at least one target, each of the plurality of communication paths being associated with an interface of one of the initiators, the method comprising:

ascertaining a load associated with the plurality of communication paths;

comparing the load with an upper threshold and a lower threshold, wherein the upper threshold is determined using a state and a power level for each of the interfaces;

when the load is greater than the upper threshold, increasing power provided to the interface associated with at least one of the plurality of communication paths; and when the load is less than the lower threshold, decreasing power provided to the interface associated with at least one of the plurality of communication paths.

21. The computer readable storage medium as recited in claim 20, wherein increasing power provided to the interface associated with at least one of the plurality of communication paths comprises providing power to the interface associated with at least one of the plurality of communication paths and wherein decreasing power provided to the interface associated with at least one of the plurality of communication paths comprises removing power from the interface associated with at least one of the plurality of communication paths.

22. An apparatus comprising:

a processor; and a memory, comprising instructions executable by a processor to perform a method, the method comprising:

ascertaining a demand on the I/O device;

determining a level of resources provided by a pool of resources using a state and a power level for each of a plurality of interfaces of the I/O device;

when the demand on the I/O device is greater than the level of resources provided by the pool of resources, increasing the level or resources provided by the pool of resources; and when the demand on the network device is less than the level of resources provided by the pool of resources, decreasing the level of resources provided by the pool of resources.

* * * * *